Figure 1:
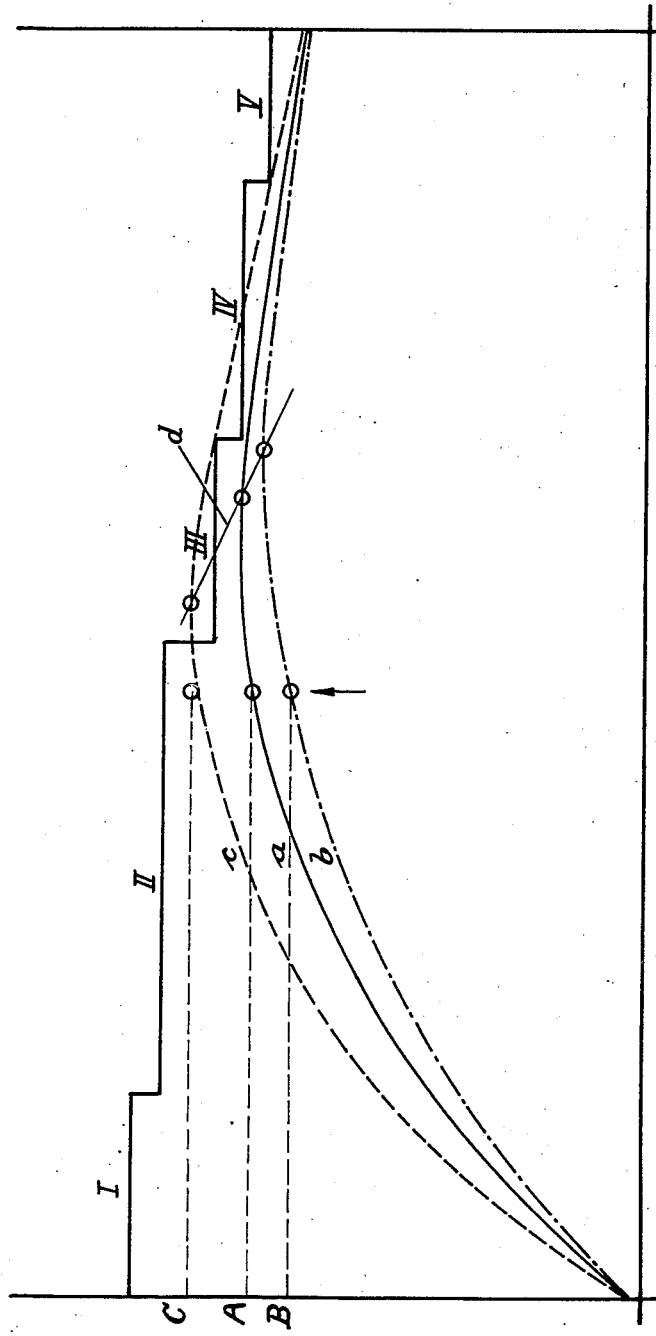

April 20, 1954  T. MÜNKER  2,676,008
METHOD FOR THE HEAT TREATMENT AND DRYING
ALSO ONLY ON THE SURFACE OF SUBSTANCES
IN CONTINUOUSLY WORKING FURNACES
Filed Dec. 5, 1950  3 Sheets-Sheet 1

Inventor
T. Münker

April 20, 1954

T. MÜNKER 2,676,008

METHOD FOR THE HEAT TREATMENT AND DRYING
ALSO ONLY ON THE SURFACE OF SUBSTANCES
IN CONTINUOUSLY WORKING FURNACES

Filed Dec. 5, 1950

3 Sheets-Sheet 3

Inventor
T. Münker

Patented Apr. 20, 1954

2,676,008

UNITED STATES PATENT OFFICE 2,676,008

METHOD FOR THE HEAT TREATMENT AND DRYING ALSO ONLY ON THE SURFACE OF SUBSTANCES IN CONTINUOUSLY WORKING FURNACES

Theo Münker, Langenberg, Germany

Application December 5, 1950, Serial No. 199,182

Claims priority, application Germany December 12, 1949

3 Claims. (Cl. 263—52)

The present invention relates to a method of heat treating materials in a continuously operating furnace.

More particularly the invention relates to a method for heat treating materials in a continuous manner in which the materials to be treated are passed through a continuously operating furnace in which the rate of travel of the material through the furnace is regulated in accordance with the temperature of the material being treated at a point within the furnace.

Methods for heat treating material in a continuously operating furnace are applied in numerous branches of industry. For example, in the manufacture and processing of articles or bands or strips of metal or metal alloys, ceramic materials, glass, cellulose materials and their combination, synthetic resins and other materials, furnaces are utilized in which the material to be treated is heated throughout or is surface heated to the extent desired whereby the material, or article as the case may be, is subjected to changes in its physical state or properties. Such heat treating measures are also applicable to the lacquer coating art. Continuously operating furnaces of this type frequently have zones of different temperatures so as to be able to subject the material to be heated to a time controlled heat treatment. The adjustment of the heat treatment is effected with a view of obtaining as high an output as possible and of imparting the desired properties to the material as uniformly as possible.

It is known in the art to regulate the temperature of heat treating furnaces of this character by a heat sensitive device, for example a pyrometer, and to utilize the measurements obtained thereby to control furnace conditions.

I have ascertained through long research in connection with industrial furnaces, that known methods do not result in a control which is free from objection because the temperature of the material does not stand in an equivocal relation with the temperature development in the various furnace zones.

It is therefore a primary object of the present invention to provide a novel and effective method of heat treating materials to impart the proper characteristics thereto and automatically control the development of temperature in all the furnace zones in dependence upon undesired changes of furnace operating condition and upon given changes in the heat receiving properties of the treated material which may be occasioned by the thickness, breadth, quality of material, or surface condition thereof.

A further object is to provide a safe and efficient method of heat treating materials in which in order to improve the production output and to obtain, if desired, special properties in the material being treated which consists in subjecting the material to a very high heat effect.

It is thus preferable in an electrically heated muffle furnace utilized for the continuous annealing of metal strip, to adjust the temperature of some of the furnace zones through which the strip travels to a desired value. Since, for practical reasons, a continuous resetting of the furnace temperature is unsuitable, with the total width of the furnace otherwise uniformly utilized, the rate at which the material travels through the furnace may be varied in accordance with the momentary thickness of the strip, and in such a way that approximately the same quantity of material passes through the furnace in the same time. In this example, this means that a thinner strip travels through the furnace quicker than a thicker strip. For these reasons, furnaces operating on the above principle are provided with regulating and control means in order to provide for an alteration of the rate at which the strip to be annealed travels through the furnace. For this control, such furnaces are generally fitted with speed tachometers, so that the rate of travel of the material to be treated may be adjusted for a certain thickness of strip or some other dimension of the object to be annealed.

This method of operation involves various drawbacks. It has been found in practice that the temperature conditions in annealing furnaces do not always remain constant, in spite of the adoption of regulating devices for ensuring uniform furnace temperatures. Thus, for instance, heating elements may temporarily fail through defects. Additionally and normally, different substances are treated, such as when different metals or metal alloys, are to be annealed and which, occasionally, have different specific heats. Thus the time required for annealing, the annealing temperatures and the rates of travel will vary. Also the utilization of the greatest possible effective furnace width is not always the same, since with less utilization of the width, the rate of heating becomes quicker and the speed at which the treated material passes through must be greater than with maximum utilization of the width.

Great differences in the heating up of the material may arise due to distinctive surface conditions thereof. As is well known, a dark or mat surface absorbs more heat through radiation than a light-colored or bright surface, which under certain circumstances may even be reflecting. Under these circumstances it is difficult to determine the correct rate of travel for each surface. In practice, great mistakes are made for this reason, since the various influencing factors are continually fluctuating during service, with adverse results on the output of the furnace, as well as on the quality, economy of production and uniformity of the treated material.

In contrast thereto the present invention relates to a method of heat treating materials in a continuously operating furnace which is first of all characterized by the special step according to which the material being treated travels through a furnace section, the temperature of which lies above the critical treatment temperature of the material, at a speed, the rate of which is adjustable by means of a measuring instrument influenced by the heat of the material to be treated so that the temperature of the material being treated remains below the critical value. The present invention is particularly suitable for the treatment of heated and annealed material, for instance, for annealing and heating semi-finished products of metal and metal alloys, likewise for the continuous drying or surface treatment of protective or other coatings in furnaces through which the material travels and for the drawing or pulling of metal strips or bands through continuously operating furnaces as well as for similar fields of application. It is then preferable to use a radiation pyrometer arranged at a distance from the annealed material in accordance with its optical dimensions and which is directed with its optical axis onto the workpiece, including thereby also a device adapted to maintain the temperature at a required value. Thus it is possible for the control appliances for the furnace to be timely and automatically brought into action by relay devices whenever a tolerance value of the desired temperature is exceeded. The value of the temperature measurement indicated by the appliance may also serve as an auxiliary means in the case of manual control, in order to permit proper adjustment to the correct rate of travel of the material through the furnace. Consequently, by the invention, an automatic regulation of the speed of material travel is possible in the furnace through the provision of at least one pyrometer for determining the warmth or heat content of the material, the pyrometer through its indicating equipment causing power impulses and thus the actuation of automatic speed regulating devices.

Figure 2:
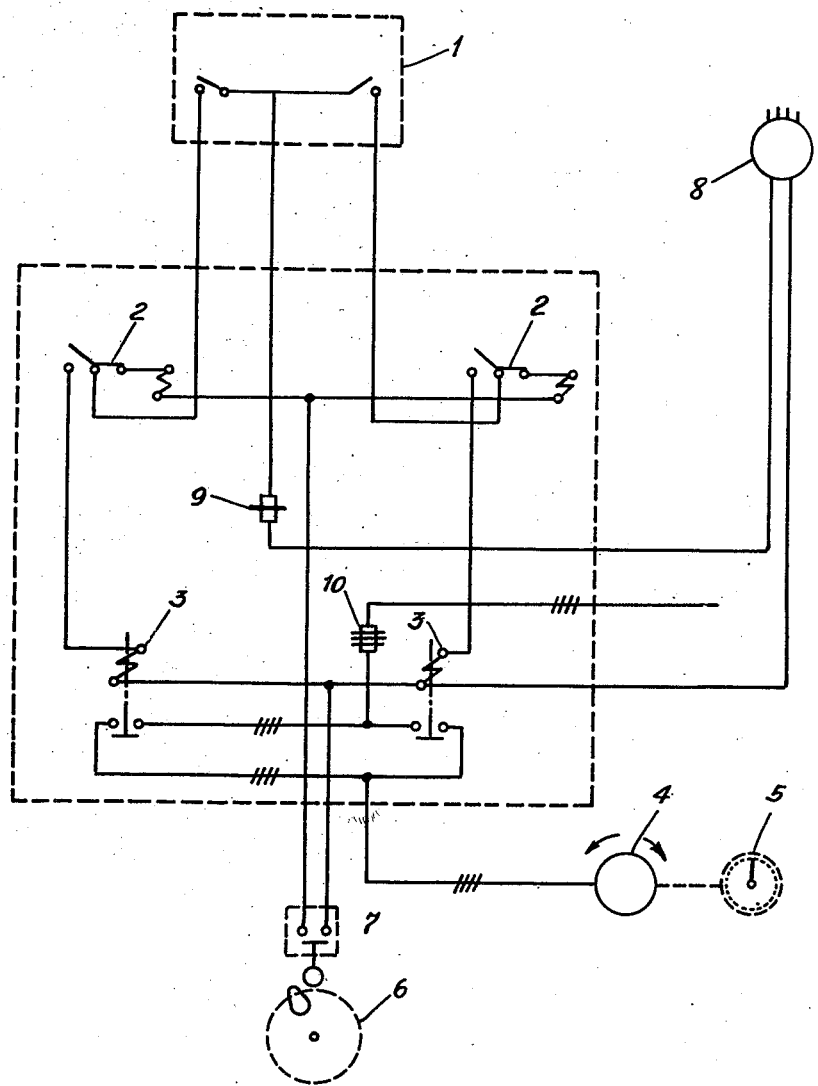
Figure 3:
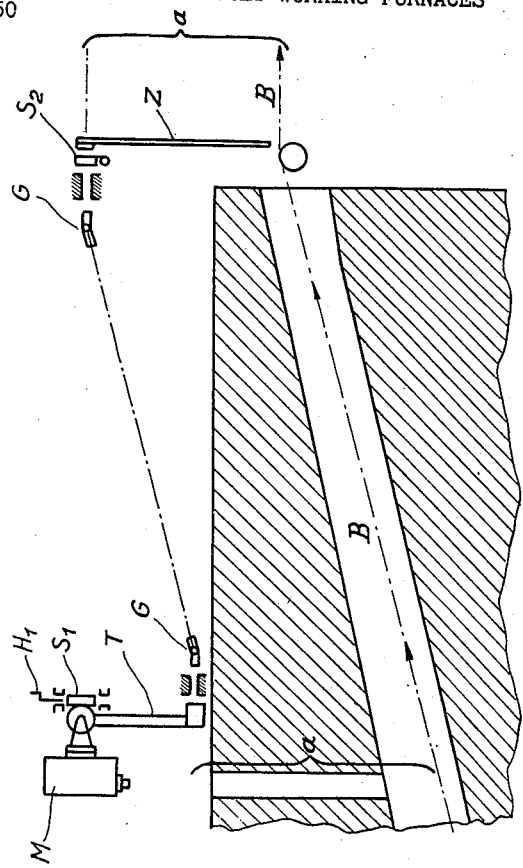
Figure 4:
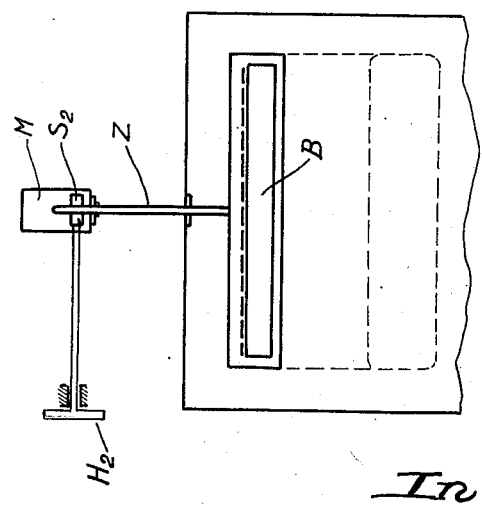

Additional objects will be apparent from the following description taken in connection with the accompanying drawings, in which Figure 1 is a graph illustrating temperature conditions existing in a furnace, and which graph further sets forth the principles of the invention. Figure 2 is a wiring diagram diagrammatically illustrating the control of the speed of passage of material through the furnace. Figure 3 is a diagrammatic view partly in section illustrating the exit end of the furnace, and Figure 4 is a diagrammatic and elevational view of the arrangement in Figure 3 as viewed from the right.

The invention is applicable to a furnace for continuous heat treating material such as for annealing metal strips. As is well known in the art, such furnaces are usually electrically heated consisting of a tunnel like structure including a heating channel of flat rectangular cross section as apparent from Figures 3 and 4. In longitudinal section as is clear from Figure 3, the exit portion of the passage is inclined upwardly. As is conventional, the inner walls of the furnace have arranged thereon heating elements which can be controlled independently or by groups in order to influence the heat output thereof and thus the heat content of the different regions or zones in the furnace.

As is conventional in the art, material to be heat treated is fed into and through the furnace by a suitable conveying means.

A heating passage through the furnace has two essential heating regions. In the first region, the material to be treated is still in the process of heating up, that is its heat content is still rising, and in the second region the material to be treated reaches its highest temperature and then cools down.

From Figure 1, it is clear that the furnace zones constitute the first region where the material is heating up and zones III, IV and V constitute the second region where the material reaches its highest temperature and then cools down prior to exit from the furnace. As is indicated hereinafter, the temperature of the regions is controlled in such a manner that in relation to the heat receiving qualities of the material being treated, a temperature above the critical treatment temperature of the material exists in the second heating region, which in total comprises the zones III, IV and V.

The speed control means that regulate the speed of passage of material include as set forth hereinafter, means for protecting the radiant heat that is the heat content of the material, and these means as diagrammatically illustrated in Figure 2, initiate control impulses for regulating the speed of travel of the material. The detecting point, that is the location of the means for detecting the radiant energy of the material, is at the point indicated by the arrow in Figure 1, namely, in the first region in which the material is heated to a point lower than the desired maximum temperature and at a point in that first region in proximity to the second region. The material, of course, continuously passes through both regions, and the heat in the second region is maintained above the critical treatment temperature. It is thus clear that the radiant energy of the material is at a point well within the furnace so that it can regulate the speed of passage in accordance with temperature of the material at the detecting point in order to maintain the temperature of the material below the critical treatment temperature while it is passing through the second region, namely, the zones III, IV and V. It follows that the detection of the material treatment temperature occurs in a point at its passage through the furnace when the heat content of the material is still rising. It is therefore clear that the speed of passage of material through this second region is regulated so that the material is not subjected to damaging heat treatment. The critical treatment temperature will, of course, depend on several factors with regard to the peculiarity of the material being treated and the results to be obtained by the heat treatment.

For instance, when treating metal and metal alloys especially when soft annealing, it is necessary to take into consideration the fact that the material to be treated undergoes metallurgical alterations or changes, especially with regard to its structure. Particularly the metal recrystallizes and thus homogenization or heterogenization and growth of grain occurs. The process of recrystallization occurs very rapidly when the necessary temperature has been reached and it starts more quickly if the material has been hardened by a previous cold rolling or cold drawing, as is the case with strips of wire.

On the other hand, the soft annealing process determines the fineness and regularity of the grain. The more rapidly the required crystallization is attained, the finer will be the grain structure, and this is the most desirable result. Thus, the temperature of the heating passage of the furnace in the heating region comprised by zones III, IV and V being higher than the temperature of the material to be treated, a quick recrystallization and a correspondingly fine grain structure can be attained if the material is heated to the requisite recrystallization temperature as rapidly as possible. By using a high initial temperature or heating up temperature in furnace zones I and II, constituting the first heating region, an existing cold hardness may be removed and a fine grain structure attained.

In certain instances, however, this will result in the formation of undesired alloy phases unless adequate steps are taken to avoid these drawbacks.

Thus, for instance, in the case of the brass alloy containing 63% Cu, remainder zinc, a $\beta$-brass may form along with the usual $\alpha$-brass, or in the case of the aluminum alloy with copper and magnesium additions extensive homogenizing may occur, through which a certain age-hardening, upon annealing, is possible. This occurs if the cooling of the semi-finished product is accomplished too quickly. Also in the case of steels, similar difficulties may be encountered. Furthermore, when the annealing temperatures are too high, a certain granulation commences. Since granulation and the formation of other alloying phases are all dependent on time, any heating to a too-high recrystallization temperature should be of only short duration, in order to avoid these undesired conditions.

Moreover, upon reaching the determined or necessary recrystallization temperature, it is often desired to cool the material down slowly, in order that the desired homogenizing or heterogenizing processes which are dependent on time occur correctly, and thus obtain, for example, an optimum softness of the material. With the process according to the invention all requisite theoretical temperature conditions can be set accurately by the controls and the heat radiation of the material in the furnace.

With the commercial types of furnaces, it is in practice generally impossible to observe the aforementioned conditions during annealing, since, in view of possible over-annealing and to ensure adequate safety, the temperature of the furnace cannot be set higher than the desired temperature of the material. Because of this, the time taken for the annealing process is in the first place greatly lengthened.

With the method of working according to the invention, the aim is to be able to regulate the furnaces quickly and within wide limits, for instance to set the temperatures in the inlet zones of continuous furnaces so high, that a rather great difference in temperature between the furnace space and the material causes the material to heat up quickly in the desired manner, and through suitable setting of the other zones the requisite recrystallization temperature can exist only for a short time. In these cases, it is of special advantage if a temperature radiation-control appliance is located so that the radiant heat of the material in the furnace may always be detected by the appliance shortly before the material traveling through the furnace has reached its highest temperature. The adjoining parts of the furnace may then be arranged in such a way that the material is led slowly through the zone of critical temperature, as shown in the accompanying graph, Figure 1. The furnace conditions according to Figure 1 are assumed to be such that the furnace plant for the continuous annealing of strips of metals and metal alloys is subdivided into five different zones I to V for setting the furnace temperature, and the setting of the zone temperatures is so chosen that zone I at the furnace inlet has the highest temperature, and zone V at the outlet the lowest.

In Figure 1 the lengths of the furnace from the inlet to the outlet are plotted as abscissae, and the furnace temperatures as ordinates. The desired rate of travel through the furnace is designated with $a$, the extra rapid rate with $b$ and the too-slow rate with $c$. Correspondingly, A designates the desired course of temperature or measured temperature, B the course of temperature or measured temperature with extra rapid speed through the furnace and C the course of temperature or measured temperature with too-slow speed of the material. The arrow indicates the practical measuring spot, where it is determined from the temperature measurement whether the rate of travel must be accelerated or retarded; $d$ designates a line of displacement of the highest points for different courses of temperature. The course of temperature of the material being annealed should follow the curve $a$.

A certain speed of the material through the furnace should be maintained, in dependence on the furnace temperature, the thickness and width of the annealed material, the alloy and surface quality. According to the invention, the measuring instrument for the temperature radiation (or pyrometer) of the material should be placed before the highest point of the temperature of the material, as indicated by the arrow. In other words, the detecting period is in the first heating region where the material is still heating up at a point in proximity to the second heating region in which the material will reach a desired elevated temperature. If the rate of travel through the furnace is too fast, say in accordance with the curve $b$, the indicated temperature falls from A to B. On the other hand, if the speed is too low, the temperature of the material rises, and consequently the radiant heat, from A to C. The pyrometer initiates suitable control impulses for retarding or accelerating the speed of travel of the material passing through the furnace, so that the course of annealing is ensured according to the desired temperature curve $a$. Figure 2 illustrates by way of example a form of embodiment of the wiring for the automatic regulation of the speed of passage of material through a continuous strip-annealing furnace. From the pyrometer including a relay 1 responsive to deviation of temperature from the desired value, two electric wires for + and − deviation lead to the time relays 2 and the reversing switches 3, whilst a third wire is led through the control fuse 9 to the conveying motor 8. From the reversing switches 3, wires lead to the drive for the speed regulating motor 4 having an indicating dial 5 for indicating the speed regulation, in which the motor fuse 10 is fitted. In addition, the reversing switches 3 and time relays 2 have wires connected thereto leading to the regulating motor 4 via cam switch 7 and cam shaft 6 driven from the conveying rollers of the furnace.

The location of the radiation pyrometer in the first heating region shortly before the area in the second region where the highest temperatures exist has also the advantage that the radiant heat of the furnace and material no longer deviate far from each other. If the temperature differences between the material in the furnace and the furnace wall are very great, the readings of the pyrometer may often be rendered erroneous by the higher radiation of the furnace wall being partly reflected onto the surface of the material, so that a higher temperature is therefore measured. Since there should be as far as possible no cooling in the region where radiation is measured, thus avoiding any reversing of the regulating characteristic, it is preferable to keep the temperature of the furnace in the neighborhood of the radiation measuring somewhat higher than the desired annealing temperature. In practice, satisfactory results are obtained when the heating-up furnace temperature in the region of the radiation measuring is chosen 30 to 50 degrees centigrade higher than the temperature of the material in the furnace, say, strip metal. With strongly reflecting material being annealed, slighter differences are better than with absorbing materials.

The desired temperature of the furnace wall is in many cases preferably coupled to the desired temperature indication of the pyrometer in such a way that, if there is a drop in the temperature of the material in the measuring zone, the furnace temperature is lowered to a similar extent.

Also by the interposition of suitable protecting screens, it is possible to prevent undesired furnace radiation in the range of the radiation measuring of the annealed material. This is to be particularly recommended if the furnace plant does not include a sufficient number of zones with different adjustable temperatures.

When working with the method as per invention, the following advantages are obtained:

(1) The material travels through the furnace much quicker than has hitherto been usual, so that the output of the whole plant is improved.

(2) The material becomes finer in grain and possesses a deformability for deep drawing purposes which otherwise has not been obtained, or was obtained only seldom and with difficulty, since total recrystallization is a consequence of the brief, high annealing temperature.

(3) The possibility exists of obtaining definite conditions to a great extent automatically, since through rendering the plant automatic as described it is assured that heating and cooling conditions will always be kept the same. Thus the mental conceptions of the operator are eliminated, and any fluctuation occurring through alteration of the annealing conditions is automatically compensated for.

When heating up materials that have to be deformed when hot, it is practical that the temperature required for hot deformability be reached quickly and with certainty. The method of this invention may also be employed in such instances with equal advantages, that is, to provide a higher furnace output, increased economy in operation and the provision of specialized material treatment, whereby more favorable conditions for hot deformability are attained.

In practicing the method according to this invention, the rate of that is, the rate the material, at which it passes through a continuous furnace may be regulated at any time in accordance with the radiant heat of the material. It is then advisable that the temperature fluctuations of the material passing through the furnace be confined within the narrowest possible limits. The control devices for providing automatic regulation of the speed of passage are therefore operative to accomplish this result. Since the annealing or drying process extends over a time interval commencing with the admission of the material into the furnace and ending when the material leaves the furnaces, the automatic controllers should be suitably responsive during this interval. In an instance where the temperature of the material passing through the furnace is higher than the required treatment temperature, the radiation pyrometer initiates actuation of a relay which furnishes an impulse to affect an increase in the rate of travel or passage. Thereby the electric control is so operated that the next impulse to speed up the output is initiated only when the material that was still outside the furnace at the preceding impulse, has almost passed through the furnace. If the radiant heat of the material has not yet reached the desired value after a given and set interval of time or after the material has travelled a definite length of travel, a further impulse will be given to increase the rate of travel. When the desired value or course of treatment temperature has been reached with this method of working, the impulses to accelerate the output are discontinued. If the speed of travel is too great and the set temperature is not yet attained, impulses may be given through the radiation pyrometer and the relay in the opposite sense so as to retard the speed of travel in the same steps as had formerly been used to bring about an acceleration of the speed. The control regulation for increasing and retarding the speed of passage may also occur continuously with the procedure being preferably so slow in action that very great temperature fluctuations in the material traveling through the furnace are avoided. Such control regulations may be effected electrically in such a way that the alterations in speed are obtained by influencing the field of the motor that drives the furnace conveying means. If the motor is fed through grid-controlled rectifiers, a regulation may be obtained by altering the grid voltage. Also a Ward-Leonard control system may be employed. The desired control may be effected mechanically so that by altering the ratio of, say, an infinitely variable gear, the desired control action is attained.

In order to exclude over-control as far as possible, the radiation pyrometer is preferably provided with a tolerance range, and the relays only respond at the limits of that range. If such a tolerance range is adjustable, this will facilitate adjustment for the various treatment conditions desired.

To maintain the prescribed course of temperature as accurately as possible, it is desirable to control the amount of acceleration of the rate of travel, as much as possible in dependence upon the rate at which the strip travels through or in other words, the existing speed of travel or passage. Similar control conditions result with percentage changes of speed per control impulse. With high rates of travel, the increase or decrease in speed at one control impulse is then greater than at low speeds. Inasmuch as the momentary rate of travel is also a function of the amount of material passing through the furnace, the acceleration or retardation may also be brought about in accordance with the amount or quantity of material or the size of the pieces of material the distance apart of the pieces in the case of conveyor-line operations, and in such manner that in the case of thin materials the alteration in speed is greater than compared with an alteration in the case of thicker materials, this being taken into consideration by the speed control effected by the present invention. Thus when treating material of the same composition but of different dimensions such as when heat treating strips of different thickness and width, the control of the rate of travel through a continuous furnace is so effected that the alteration in speed always stands in a definite ratio to the momentary rate of travel or, that is, the existing speed of travel.

Figure 2 illustrates a wiring diagram in which the control of the speed of travel of the material is derived from a camshaft driven from a furnace conveying shaft. Independent of the rate of travel of the material, the cam always actuates the switch 7 after the material has passed along a certain distance. Should any deviation from the desired temperature range occur the control motor is driven through a definite number of revolutions via the relay responsive to the temperature deviation, time relay 2 and reversing switch 3, so that the speed control is either effected in the positive or in the negative sense. In many cases, a sweeper contact is also provided between cam switch and time relay.

If a continuous furnace is not traversed by an endless strip, but by individual pieces passing therethrough at definite distances apart, it is essential that the control of the radiant heat of these pieces be effected only when the suitable section or spot to be measured arrives at the point which is intersected by the optical axis of the measuring appliance. This may, for instance, be effected by the material that passes through the furnaces actuating a contact, either mechanically by coming against a stop on a lever, or by optically interrupting a barrier ray, which action then causes the deviation of the radiant heat set on the measuring appliance in the positive or negative sense to come into operation for further transmission in order to bring about correction. In the case that the contact should be actuated by means of rays, the material passing through may, for instance, interrupt a barrier ray penetrating through the furnace across the traveling direction and impinging on a photocell adapted to respond to the directed rays to trip the switching operation. Thereby it should be noted that the photocell which each time ascertains the momentary position of the traveling material, responds in a range of the rays which is not provided in the furnace. This is, for instance, the case, if the cells only respond to very short-waved radiation; such cells are known. It is understood that also another kind of radiation may be chosen for this barrier ray, provided that the radiation of the furnace and the radiation of said barrier do not interfere with one another. This may be accomplished by the utilization of suitable filters to ward off any undesired radiation from the radiation barrier ray.

The radiant heat of the material may also be utilized to control the furnace temperature, but this is less advisable, since the furnace possesses a certain thermal inertia, and the effect of the control therefore takes too long to act. Thereby the performance of the furnace may be reduced and the service life of the furnace be adversely influenced by the rise and fall of the heating.

When annealing metals or metal alloys for recrystallizing, the method of this invention provides optimum conditions of output and quality when the highest temperature of the material passing through the furnace lies a little above the momentary recrystallization temperature of the material. This avoids any heating to unnecessary high temperatures and also, when the maximum furnace temperature is limited by setting the furnace, the maintenance of the material for an unnecessarily long time at its annealing temperature is also avoided.

The heating to high temperatures entails first an unnecessary dissipation or squandering of heat energy, and in addition a lengthening of the annealing time. This simultaneously results in the case of drying processes, in a reduction in quality of the material passing through the furnace and a reduction in the output of the plant. An annealing temperature which is too high may also result in a coarsening of the grain through granulation, and thus the quality of the finished semi-products is adversely influenced. These mistakes are avoided by working according to the manner disclosed above, since the momentary working conditions are indicated by the material itself, and thus all fluctuations in service are compensated for to the greatest possible extent.

The aforedescribed procedure provides among other advantages, the possibility of essentially increasing the performance of a continuous furnace by widening the temperature difference between the furnace space and the material therein. The greater this temperature difference, the quicker will the material in the furnace be heated up. Since, by adopting the working method disclosed above, it can be ensured that the temperature of the material passing through the furnace does not exceed a desired value and it is thus possible to obtain a favorable increase in the rate of travel of material and thus in the output of the plant.

With many metallic substances, a quick heating up involves the advantage that the size of grain produced becomes smaller and thus the quality of the treated material is enhanced. Furthermore, the surface of the material to be treated, which is often wet with oil residue, blazes off better, so that a better and cleaner surface finish is obtained after the annealing. In view of this reason it may be unnecessary to use degreasing baths before introducing the material into the continuous furnace.

In following the teaching of this invention it is possible to substantially reduce the size of the furnace in comparison with the size of known furnace plants of this type, so that initial plant cost is reduced. This factor also renders it possible to erect a furnace plant in location formerly considered to be too small. The costs of operation are reduced since the heating up of the material to be treated occurs quicker at higher furnace temperatures.

A further advantage when annealing strip metal as taught by this invention, consists in the fact that annealing may also be carried out to produce a certain degree of hardness. As is well known, in the case of many metals and metal alloys, certain mechanical strength-values are obtained by the subsequent application of a definite degree of strain hardening, for instance by cold rolling or drawing, since the yield point, the breaking strength and the Brinell hardness, with decreasing elongation values, will in general be raised with an increased degree of strain hardening. If the strain hardening applied before the annealing is removed by an incomplete annealing which provides an imperfect recrystallization of the hardened structure, it is possible, for example in the treatment of brasses, to reach a strain-hardening degree of from ⅛ to ¼ hard by the annealing. Up to now this method of operation could not be adopted, since the accuracy of working conditions to be maintained during such annealing could not be effected in practice. When work is done in the described manner, it can readily be effected so that the desired temperature at the heat-radiation detecting appliance is lowered. Thus, the more the desired temperature is lowered, the greater will be the degree of hardness produced. But since the production of a uniform degree of recrystallization becomes more difficult the farther the desired degree of recrystallization lies away from complete recrystallisation, it is in general not advisable in this manner to produce degrees of hardness exceeding ¼ hard.

The production of a uniform degree of hardness by annealing is of great practical importance, since the finishing costs can thereby be considerably lowered. By means of the invention, it is in many cases possible to bring the material to the desired final gauge by rolling or drawing. Previously it was necessary to arrange another operating cycle after completion of soft annealing in order to subsequently produce the desired degree of strain hardening by rolling or drawing. A further advantage of the method of working in accordance with this invention resides in the reduction of the annealing costs. According to the operational procedure previously described, with a uniform adjustment of the zone temperatures, through use of the now lower-set temperature of the material, the rate of travel is correspondingly increased, so that the output of the furnace is still partly substantially increased. Obviously, it is also possible to obtain incomplete annealing by lowering the furnace temperatures. This method of operation is, however, objectionable in that time is lost by the lowering of the furnace temperatures and the service life of the furnace plant is unfavorably influenced so that the performance thereof falls off considerably.

The new annealing method may also be adopted in cases where the annealing is effected under conditions in which air is excluded or when a certain furnace atmosphere is provided. In these cases the detection of the annealing temperature may be effected through windows which close the measuring opening communicating with the furnace passage. A suitable substance must be chosen for these windows, that is a material permeable to heat rays, for example, salts, as $CaF_2$, or certain types of glass. It is preferable that the layer through which the rays must pass be kept as thin as possible to avoid radiation losses. These windows must moreover be replaceable, since for instance, due to precipitation of grease distilled from the material being annealed, a coating, may result which adversely affects the permeability of the windows to the heat rays. The windows are of domed shape to diminish the risk of cracking. Cracking might occur due to the great changes in temperature conditions, particularly when changing the windows. The mounting of such windows may also be effective so as to keep the hot air, which may issue to leak from the furnace space through the measuring openings, away from the measuring appliance.

In the case of continuous furnaces wherein several narrow strips are annealed alongside each other, care must be taken that the lens of the photoelectric heat-radiation detecting or measuring means is not directed so that the detection is made at an area between the strips. Such a measuring appliance can be directed with the help of an optical sighting device. This method is, however, rather inconvenient, since the men in charge must be continually getting onto the furnace for this purpose. It is better for the directing device to be fitted at the exit end of the furnace, so that those in charge of the furnace may at once see whether the measuring appliance is correctly directed. The device may, for instance be designed like the form of embodiment shown in Figures 3 and 4.

These figures schematically illustrate, in front elevation and in section, the exit end of a continuous furnace for treating strip material. The detecting means M is, together with its lens, correctly directed first of all lengthwise by the manipulation of a handwheel $H_1$ and a worm gear $S_1$. The further adjustment can be effected by the pointer Z arranged above the emerging strip B, since the control spindle T for the detecting means is moved through linkage including the ball joints G so that the distance $a$ from the point of rotation of the pointer Z to the upper surface of the strip, is the same as the distance $a$ from the point of rotation of the measuring lens to the upper surface of the strip within the furnace. The setting can be easily effected and supervised at the exit end of the furnace by means of a further worm gear $S_2$ with the help of the handwheel $H_2$.

What I claim is:

1. A method of continuously heat treating materials comprising passing material successively and continuously through a first heating region and furnishing heat thereto to elevate the temperature of the material to a point lower than the desired maximum temperature, passing the material through at least a second heating region in which the material reaches a desired elevated temperature while maintaining the temperature in the second region above the critical material treatment temperature, detecting the radiant energy of the material at a point in said first region in proximity to said second region and regulating the speed of passage of the material in accordance with the temperature of the material at the detecting point to maintain the temperature of the material below the critical material treatment temperature while the material is passing through said second region.

2. A method of continuously heat treating materials comprising passing material successively and continuously through a first heating region, furnishing heat thereto to elevate the temperature of the material to a point lower than the desired maximum temperature, passing the material through at least a second heating region in which the material reaches a desired elevated temperature while maintaining the temperature in the second region above the critical material treatment temperature, detecting the radiant energy of the material at a point in said first region in proximity to said second region, regulating the speed of passage of the material in accordance with the temperature of the material at the detecting point to maintain the temperature of the material below the critical material treatment temperature while the material is passing through said second region, and maintaining the change of speed of passage of material in a definite ratio to the existing speed.

3. A method of continuously heat treating materials comprising passing material successively and continuously through a first heating region, furnishing heat thereto to elevate the temperature of the material to a point lower than the desired maximum temperature, passing the material through at least a second heating region in which the material reaches a desired elevated temperature while maintaining the temperature in the second region above the critical material treatment temperature, detecting the radiant energy of the material at a point in said first region in proximity to said second region, regulating the speed of passage of the material in accordance with the temperature of the material at the detecting point to maintain the temperature of the material below the critical material treatment temperature while the material is passing through said second region, maintaining the change of speed of passage of material in accordance with the existing speed and the size and amount of material passing through the first region at the detecting point.

References Cited in the file of this patent
UNITED STATES PATENTS

| Number | Name | Date |
| --- | --- | --- |
| 1,945,652 | Martin | Feb. 6, 1934 |
| 1,951,426 | Littler | Mar. 20, 1934 |
| 2,089,015 | Bucknam et al. | Aug. 3, 1937 |
| 2,205,182 | Whitten | June 18, 1940 |
| 2,275,265 | Mead | Mar. 3, 1942 |
| 2,337,410 | Peters | Dec. 21, 1943 |
| 2,518,905 | Kniveton | Aug. 15, 1950 |
| 2,543,388 | Urquhart | Feb. 27, 1951 |